Patented Oct. 28, 1952

2,615,817

UNITED STATES PATENT OFFICE 2,615,817

GLASS COMPOSITIONS

John Edwin Stanworth, Sheffield, and Alan Edward Dale, Barlow, England, assignors to General Electric Company, a corporation of New York No Drawing. Application October 18, 1950, Serial No. 190,893. In Great Britain November 11, 1949

2 Claims. (Cl. 106—54)

This invention relates to the production of glasses capable of resisting attack by the vapors of alkali metals such as sodium. Glass compositions of the alkali-resistant type are of value in connection with envelopes for electric discharge lamps having within the envelope an alkali metal which becomes vaporized during the operation of the lamp. Glasses capable of resisting attack by alkali metal vapor generally do not possess qualities which render them suitable for constituting the hollow envelope of electric discharge lamps; and it has generally been the practice to make the envelopes of a glass of the soda-lime-silicate type, which does not resist attack by alkali metal vapor but which otherwise possesses qualities rendering it suitable as an envelope material, and provide the interior of the envelope with a coating of a glass of the borate type which resists the attack.

In manufacturing such composite glass envelopes, it is obviously important that the glass resistant to alkali metal vapor should have a coefficient of thermal expansion which does not greatly differ from that of the glass constituting the major portion, or foundation, of the envelope since if a material discrepancy between the thermal expansions is present, there will be danger of the envelope becoming weakened due to cracking as its temperature rises during the operation of the lamp or even as the temperature falls during the manufacture of the tubing from which the envelope is finally made.

The principal object of the present invention is to provide alkali vapor resistant glasses capable of sealing to borosilicate glasses and which possess features rendering them superior to the borate glasses for sealing to soda-lime-silicate glasses hitherto used in composite articles of the type previously mentioned. Still further objects and advantages of the invention will appear from the following description thereof.

Glass compositions according to the invention are those which possess the following constituents in percentages by weight.

Phosphorus pentoxide ($P_2O_5$) _____ 10-33
Boric oxide ($B_2O_3$) _____ 26-49
Alumina ($Al_2O_3$) _____ 15-38
One or more oxides of the group consisting of oxides of calcium, magnesium and barium (CaO, MgO and BaO) _____ 15-25
Silica ($SiO_2$) being limited to less than____ 10

Glasses having compositions falling within this range may be referred to as borophosphate glasses. These glasses are suitable for forming an alkali-resistant layer on hard borosilicate glasses used for forming the envelopes of electric discharge lamps which become heated to a temperature materially above atmospheric temperature during operation.

We prefer to restrict the range of composition of the glasses according to the invention to the following percentages by weight:

$P_2O_5$ _____ 13-20
$B_2O_3$ _____ 35-46
$Al_2O_3$ _____ 20-29
CaO and/or MgO and/or BaO more than__ 15
$SiO_2$, less than _____ 10

These glasses melt easily at normal glass melting temperatures and can be worked into composite tubing by the normal methods which have hitherto been used.

One example of a preferred glass composition according to the invention has the following constituents expressed in percentages by weight:

$P_2O_5$ _____ 16
$B_2O_3$ _____ 39
$Al_2O_3$ _____ 23
CaO _____ 5
MgO _____ 12
$SiO_2$ _____ 5

A glass having the composition given in this example is suitable for use in constituting with a borosilicate glass having an approximate composition in percentages by weight:

$SiO_2$ _____ 66
$Al_2O_3$ _____ 2
$B_2O_3$ _____ 24
Alkalies _____ 8 a composite glass tubing suitable for the formation of envelopes for electric discharge lamps, and for the electrode supporting stems of such envelopes. In the case of the composite glass tubing for forming the stem, the alkali-resistant borophosphate glass will be provided in the form of a layer on the exterior surface of the tube which surface is exposed to the interior of the envelope in the completed lamp.

The composite glass tubing made in accordance with the example just above quoted possesses a thermal expansion characteristic of the order of $50 \times 10^{-7}$ and it is therefore suitable for forming a hermetic seal with a metal member constituted of moylbdenum, or of an iron-nickel-cobalt alloy having the composition specified in the claims of British Patent No. 358,934. Leading-in wires of the metal or alloys of this character can be sealed into the composite glass tubing of the invention and will form hermetic seals therewith, and may be used to support, within the envelope, an electrode of an electric discharge lamp.

What we claim as new and desire to secure by Letters Patent of the United States is:

1. An alkali vapor resistant borophosphate glass comprising, by weight, 13 to 20% phosphorus pentoxide, 35 to 46% boric oxide, 20 to 29% alumina, less than 10% silica and more than 15% and not more than 25% of one or more oxides of the group consisting of oxides of calcium, magnesium and barium.

2. An alkali vapor resistant borophosphate glass comprising, by weight, approximately 16% phosphorus pentoxide, 39% boric oxide, 23% alumina, 5% silica, 5% calcium oxide, and 12% magnesium oxide.

JOHN EDWIN STANWORTH.
ALAN EDWARD DALE.

REFERENCES CITED

The following references are of record in the file of this patent:

UNITED STATES PATENTS

| Number | Name | Date |
|---|---|---|
| 1,547,715 | Baker | July 28, 1925 |
| 2,030,389 | Navias | Feb. 11, 1936 |
| 2,030,390 | Navias | Feb. 11, 1936 |
| 2,030,397 | Reynolds | Feb. 11, 1936 |
| 2,100,391 | Grimm et al. | Nov. 30, 1937 |
| 2,240,352 | Schmidt et al. | Apr. 29, 1941 |
| 2,466,849 | Hood | Apr. 12, 1949 |

FOREIGN PATENTS

| Number | Country | Date |
|---|---|---|
| 461,570 | Great Britain | Feb. 19, 1937 |